United States Patent
Okabe et al.

(10) Patent No.: US 11,721,822 B2
(45) Date of Patent: Aug. 8, 2023

(54) FUEL CELL SYSTEM AND AIR VEHICLE

(71) Applicant: TOYOTA JIDOSHA KABUSHIKI KAISHA, Toyota (JP)

(72) Inventors: Hiroki Okabe, Mishima (JP); Tomohiro Shinagawa, Shizuoka-ken (JP); Yoshihiro Shinozaki, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/659,940

(22) Filed: Apr. 20, 2022

(65) Prior Publication Data
US 2022/0344687 A1  Oct. 27, 2022

(30) Foreign Application Priority Data
Apr. 23, 2021 (JP) ................. 2021-073150

(51) Int. Cl.
| | |
|---|---|
| *H01M 8/04* | (2016.01) |
| *H01M 8/04746* | (2016.01) |
| *B60L 58/30* | (2019.01) |
| *B64D 41/00* | (2006.01) |
| *G01C 5/00* | (2006.01) |
| *H01M 8/04111* | (2016.01) |

(52) U.S. Cl.
CPC ......... *H01M 8/04753* (2013.01); *B60L 58/30* (2019.02); *B64D 41/00* (2013.01); *G01C 5/005* (2013.01); *H01M 8/04111* (2013.01); *H01M 8/04761* (2013.01); *B60L 2200/10* (2013.01); *B64D 2041/005* (2013.01); *H01M 2250/20* (2013.01)

(58) Field of Classification Search
CPC ......... H01M 8/04753; H01M 8/04111; H01M 8/04761; H01M 2250/20; B60L 58/30; B60L 2200/10; B64D 41/00; B64D 2041/005; G01C 5/005
USPC ....................................... 429/428
See application file for complete search history.

(56) References Cited

U.S. PATENT DOCUMENTS

| | | | |
|---|---|---|---|
| 2014/0023945 A1 | 1/2014 | Epstein et al. | |
| 2016/0351929 A1 | 12/2016 | Park et al. | |
| 2018/0003109 A1* | 1/2018 | Lents | F02C 6/14 |
| 2020/0058947 A1* | 2/2020 | Hoffjann | H01M 8/04753 |
| 2020/0075971 A1* | 3/2020 | Lo | H01M 8/04708 |
| 2021/0098810 A1* | 4/2021 | Poirier | H01M 8/04104 |

FOREIGN PATENT DOCUMENTS

| | | |
|---|---|---|
| JP | 2002352826 A | 12/2002 |
| JP | 2017-081559 A | 5/2017 |

* cited by examiner

*Primary Examiner* — James M Erwin
(74) *Attorney, Agent, or Firm* — Dickinson Wright, PLLC

(57) ABSTRACT

To provide a fuel cell system configured to increase fuel cell performance even at high altitude. A fuel cell system for air vehicles, wherein the fuel cell system comprises: a fuel cell, an oxidant gas system for supplying oxidant gas to the fuel cell, an altitude sensor, and a controller; wherein the oxidant gas system comprises an air compressor and a bypass flow path bypassing the fuel cell; wherein the bypass flow path comprises a bypass valve; and wherein, when the controller detects an altitude increase measured by the altitude sensor, the controller increases a rotational speed of the air compressor, and the controller increases an opening degree of the bypass valve.

3 Claims, 4 Drawing Sheets

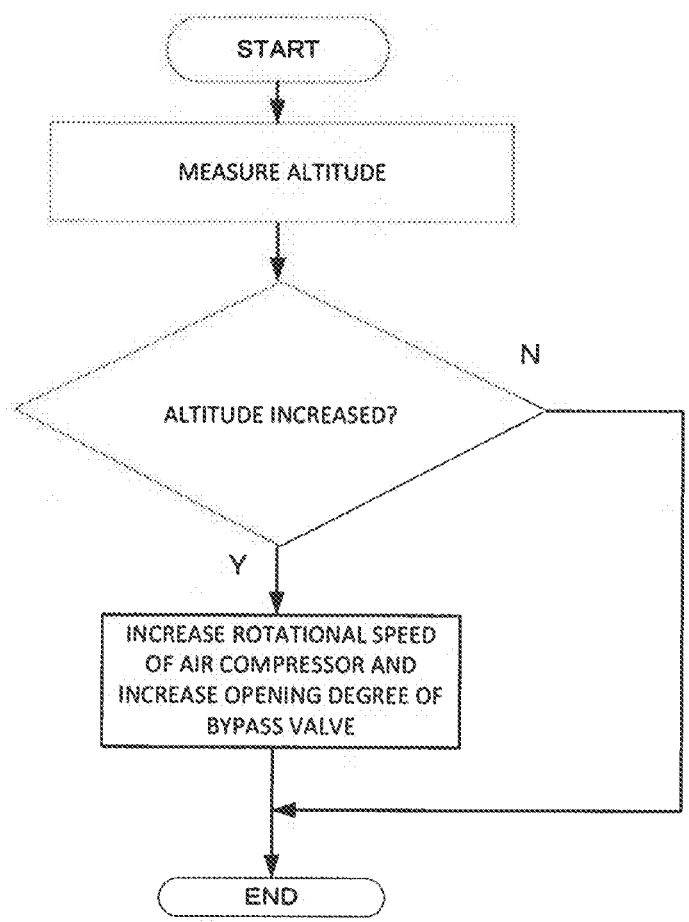

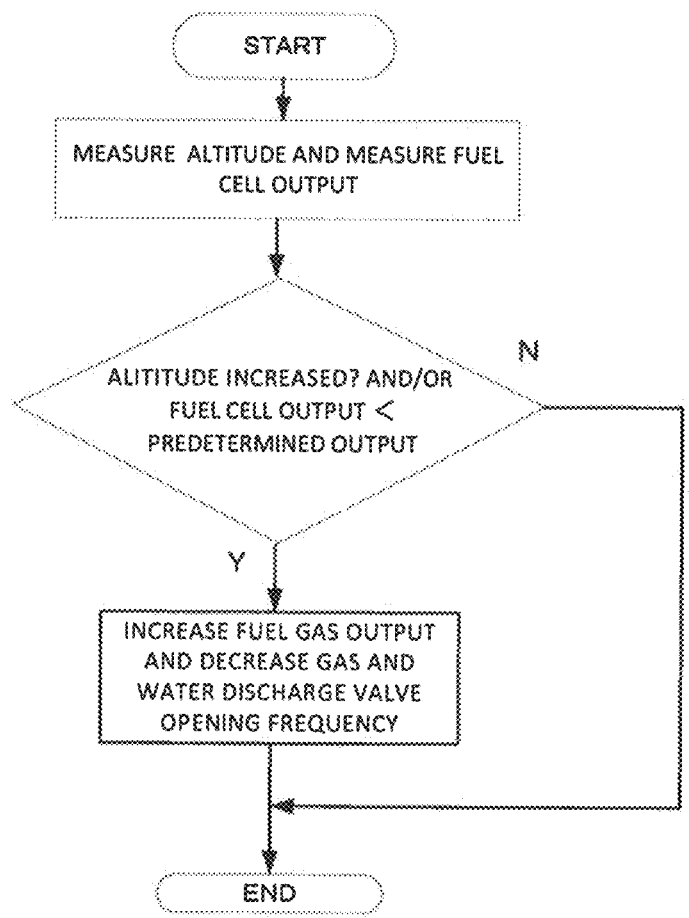

FUEL CELL SYSTEM AND AIR VEHICLE

TECHNICAL FIELD

The disclosure relates to a fuel cell system and an air vehicle.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various studies have been made on fuel cells.

For example, Patent Literature 1 discloses an aircraft using fuel cells.

Patent Literature 1: Japanese Patent Application Laid-Open (JP-A) No. 2017-081559

In the case of mounting a fuel cell in an air vehicle, compared to the case of mounting a fuel cell in a car, power generation of the fuel cell is carried out in the condition with high altitude and low atmospheric pressure.

Atmospheric pressure decreases as altitude increases. Accordingly, in the oxidant gas system during the power generation of the fuel cell at high altitude, the partial pressure of oxygen decreases, and the power generation performance of the fuel cell decreases.

In the case of the power generation of the fuel cell at high altitude, due to lower atmospheric pressure than that on the ground, in order to obtain the same oxygen supply as that on the ground, it is necessary to increase the rotational speed of the air compressor to be larger than the normal rotational speed on the ground to increase the air flow rate. Accordingly, the air flow velocity (volumetric flow rate) increases, and the amount of water vapor removed from the fuel cell increases. As a result, the fuel cell is dried and leads to a decrease in power generation performance, and the durability of the fuel cell is decreased due to the power generation in the dry state.

In the fuel gas system during the power generation of the fuel cell at high altitude, a pressure difference between the inside and outside of the fuel cell (a pressure difference between the inlet and outlet of the gas and water discharge valve) increases. Accordingly, when the gas and water discharge valve is used (opened), the amount of discharged hydrogen increases and results in poor fuel efficiency.

If the frequency of gas discharge is decreased to prevent poor fuel efficiency, the concentration of nitrogen in the fuel cell increases; the amount of discharged water decreases; hydrogen deficiency occurs in the fuel cell; and the durability of the fuel cell is decreased, accordingly. As a result, it is necessary to impose a limit on the output and to stop the system.

SUMMARY

The present disclosure was achieved in light of the above circumstances. An object of the present disclosure is to provide a fuel cell system configured to increase fuel cell performance even at high altitude.

The fuel cell system of the present disclosure is a fuel cell system for air vehicles,
wherein the fuel cell system comprises:
a fuel cell,
an oxidant gas system for supplying oxidant gas to the fuel cell,
an altitude sensor, and
a controller;
wherein the oxidant gas system comprises an air compressor and a bypass flow path bypassing the fuel cell;
wherein the bypass flow path comprises a bypass valve; and
wherein, when the controller detects an altitude increase measured by the altitude sensor, the controller increases a rotational speed of the air compressor, and the controller increases an opening degree of the bypass valve.

The fuel cell system may further comprise a fuel gas system for supplying fuel gas to the fuel cell, and an output sensor for measuring an output of the fuel cell.

The fuel gas system may comprise a fuel gas supplier and a gas and water discharge valve for allowing fuel off-gas, which is discharged from the fuel cell, to be discharged to the outside.

The controller may increase a fuel gas supply from the fuel gas supplier to the fuel cell, and the controller may decrease a frequency of opening the gas and water discharge valve, when at least one of a condition in which the controller detects the altitude increase measured by the altitude sensor, and a condition in which the output of the fuel cell is less than a predetermined output value, is met.

The air vehicle of the present disclosure comprises the fuel cell system.

According to the fuel cell system of the present disclosure, fuel cell performance is increased even at high altitude.

BRIEF DESCRIPTION OF THE DRAWINGS

In the accompanying drawings,

FIG. 4 is a flowchart illustrating an example of control of the fuel cell system of the present disclosure; and FIG. 5 is a flowchart illustrating another example of control of the fuel cell system of the present disclosure.

DETAILED DESCRIPTION

1. First Embodiment

Figure 1:
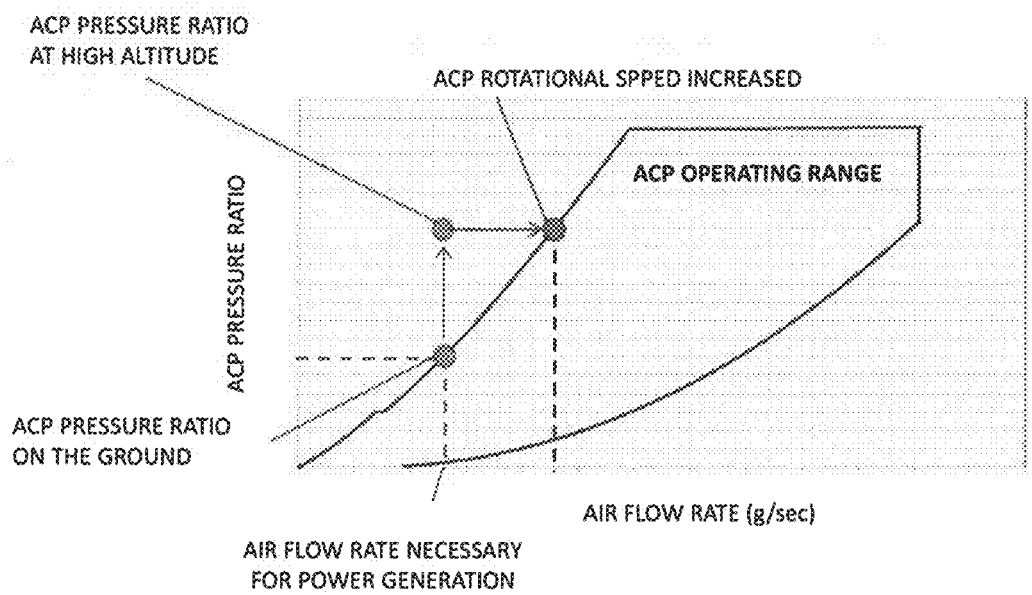
FIG. 1 is a diagram showing an example of the relationship between the air flow rate and pressure ratio of the air compressor.

The fuel cell system of the present disclosure is a fuel cell system for air vehicles,
wherein the fuel cell system comprises:
a fuel cell,
an oxidant gas system for supplying oxidant gas to the fuel cell,
an altitude sensor, and
a controller;
wherein the oxidant gas system comprises an air compressor and a bypass flow path bypassing the fuel cell;

wherein the bypass flow path comprises a bypass valve; and wherein, when the controller detects an altitude increase measured by the altitude sensor, the controller increases the rotational speed of the air compressor, and the controller increases the opening degree of the bypass valve.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel cell system of the present disclosure is mounted and used in an air vehicle.

The fuel cell system of the present disclosure may be mounted and used in an air vehicle that can fly by the power of a secondary cell.

The air vehicle of the present disclosure may be an aircraft. The aircraft may be an airplane, a vertical takeoff and landing aircraft or the like. The vertical takeoff and landing aircraft may be a helicopter, a drone or the like.

The air vehicle may include the fuel cell system of the present disclosure.

The fuel cell system of the present disclosure includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system includes the altitude sensor.

The altitude sensor measures the altitude of the air vehicle.

The altitude sensor is electrically connected to the controller, and the controller detects the altitude of the air vehicle measured by the altitude sensor.

As the altitude sensor, a conventionally-known altimeter or the like may be used.

The fuel cell system may include the output sensor.

The output sensor measures the output of the fuel cell. The output power may be electric power, voltage or current.

The output sensor is electrically connected to the controller, and the controller detects the output of the fuel cell measured by the output sensor.

As the output sensor, a conventionally-known output meter, electric power meter, voltmeter, current meter or the like may be used.

The fuel cell system includes the oxidant gas system for supplying oxidant gas to the fuel cell.

The oxidant gas system includes the air compressor and the bypass flow path bypassing the fuel cell.

The oxidant gas system of the fuel cell may further include an oxidant gas supply flow path, an oxidant off-gas discharge flow path, an oxidant gas flow rate sensor and so on.

The air compressor supplies the oxidant gas to the cathode of the fuel cell.

The air compressor is electrically connected to the controller. The air compressor is operated according to a control signal from the controller. At least one selected from the group consisting of the flow rate and pressure of the oxidant gas supplied from the air compressor to the cathode, may be controlled by the controller.

The oxidant gas supply flow path connects the air compressor and the oxidant gas inlet of the fuel cell. The oxidant gas supply flow path allows the oxidant gas to be supplied from the air compressor to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The bypass flow path bypasses the fuel cell. More specifically, the bypass flow path branches from the oxidant gas supply flow path, bypasses the fuel cell, and connects the branch of the oxidant gas supply flow path and the junction of the oxidant off-gas discharge flow path.

The bypass flow path includes the bypass valve.

The bypass valve is electrically connected to the controller. By opening the bypass valve by the controller, when it is unnecessary to supply the oxidant gas to the fuel cell, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational speed of the air compressor from the flow rate of the oxidant gas detected by the oxidant gas flow rate sensor. The oxidant gas flow rate sensor may be disposed upstream from the air compressor of the oxidant gas supply flow path.

As the oxidant gas flow rate sensor, a conventionally-known flow meter or the like may be used.

The fuel cell system may include the fuel gas system.

The fuel gas system supplies fuel gas to the fuel cell.

The fuel gas system may include the fuel gas supplier and the gas and water discharge valve for allowing fuel off-gas, which is discharged from the fuel cell, to be discharged to the outside.

The fuel gas system may further include a fuel gas supply flow path, an ejector, a circulation flow path, a gas-liquid separator, a fuel off-gas discharge flow path and so on.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

In the fuel gas supply flow path, the ejector may be disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel off gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas and water discharge valve (the fuel off-gas discharge valve) may be disposed in the fuel off-gas discharge flow path. The gas and water discharge valve is disposed downstream from the gas-liquid separator in the fuel off-gas discharge flow path.

The gas and water discharge valve allows the fuel off-gas, water and the like to be discharged to the outside (of the system). The outside may be the outside of the fuel cell system, or it may be the outside of the air vehicle.

The gas and water discharge valve may be electrically connected to the controller, and the flow rate of the fuel off-gas discharged to the outside and the flow rate of the discharged water (liquid water) may be controlled by controlling the opening and closing of the gas and water discharge valve by the controller. By controlling the opening degree of the gas and water discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the gas and water discharge valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The fuel cell system may include the cooling system of the fuel cell.

The cooling system may include a refrigerant supplier and a refrigerant circulation flow path.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally-known secondary cell such as a nickel-hydrogen secondary cell and a lithium ion secondary cell. The secondary cell may include a power storage device such as an electric double layer capacitor. The secondary cell may have a structure such that a plurality of secondary cells are connected in series. The secondary cell supplies power to the motor, the air compressor and the like. The secondary cell may be rechargeable by a power source outside the air vehicle, for example. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to a switch which may be mounted in the air vehicle. The controller may be operable by an external power source even if the switch is turned OFF.

When the controller detects an altitude increase measured by the altitude sensor, the controller increases the rotational speed of the air compressor, and the controller increases the opening degree of the bypass valve.

The increased rotational speed of the air compressor and the increased opening degree of the bypass valve may be appropriately set by preliminarily preparing a data group indicating the relationship between the altitude, the rotational speed of the air compressor and the opening degree of the bypass valve, and comparing the altitude with the data group.

FIG. 1 is a diagram showing an example of the relationship between the air flow rate and pressure ratio of the air compressor.

As shown in FIG. 1, on the ground, the air can be compressed to a desired pressure within the operating range of the air compressor. However, since the concentration of air at high altitude is lower than the concentration of the air on the ground, the air cannot be compressed to a desired pressure within the air compressor operating range, in some cases. Accordingly, at high altitude, it is necessary to increase the flow rate of the air by increasing the rotational speed of the air compressor so that air can be compressed to a desired pressure within the air compressor operating range. On the other hand, when the air flow rate is increased, it exceeds the flow rate necessary for power generation of the fuel cell. Accordingly, the air unnecessary for power generation is needed to bypass the fuel cell and be discharged to the outside by increasing the opening degree of the bypass valve.

In the present disclosure, accordingly, when the altitude is high, in the oxidant gas system, the pressure is increased by increasing the rotational speed (i.e., the air flow rate) of the air compressor (ACP) to reduce oxygen partial pressure shortages. At the same time, along with an altitude increase, the opening degree of the bypass valve is changed to supply only the air flow rate necessary for power generation of the fuel cell, thereby reducing the drying of the fuel cell.

The controller may increase the fuel gas supply from the fuel gas supplier to the fuel cell, and the controller may decrease the frequency of opening the gas and water discharge valve, when at least one of the condition in which the controller detects the altitude increase measured by the altitude sensor, and the condition in which the output of the fuel cell is less than the predetermined output value, is met.

The fuel gas supply to be increased is not particularly limited, as long as it is larger than the fuel gas supply at the time of determination or the latest fuel gas supply. It may be appropriately set within a range in which normal power generation is maintained, considering fuel efficiency.

The frequency of opening the gas and water discharge valve to be decreased is not particularly limited, as long as it is smaller than the fuel gas supply at the time of determination or the latest fuel gas supply. It may be appropriately set in the range in which normal power generation is maintained, considering fuel efficiency.

The predetermined output value of the fuel cell may be appropriately set according to the output requested from the air vehicle.

Since the atmospheric pressure at high altitude is low compared to the atmospheric pressure on the ground, the amount of hydrogen discharged by opening the gas and water discharge valve at high altitude, is large compared to the discharged hydrogen amount on the ground. For better fuel efficiency, accordingly, it is possible to decrease the frequency of opening the gas and water discharge valve. However, if the frequency of opening the gas and water discharge valve is decreased, the concentration of nitrogen (the partial pressure of nitrogen) is increased. Accordingly, the partial pressure of hydrogen in the fuel gas system is kept in a desired range by decreasing the frequency of opening the gas and water discharge valve and increasing the fuel gas supply from the fuel gas supplier to the fuel cell.

In the present disclosure, accordingly, in the fuel gas system, the frequency of discharging the fuel off-gas and the fuel gas supply from the fuel tank are controlled according to the altitude and the output of the fuel cell, and better fuel efficiency is obtained with maintaining normal power generation.

Figure 2:
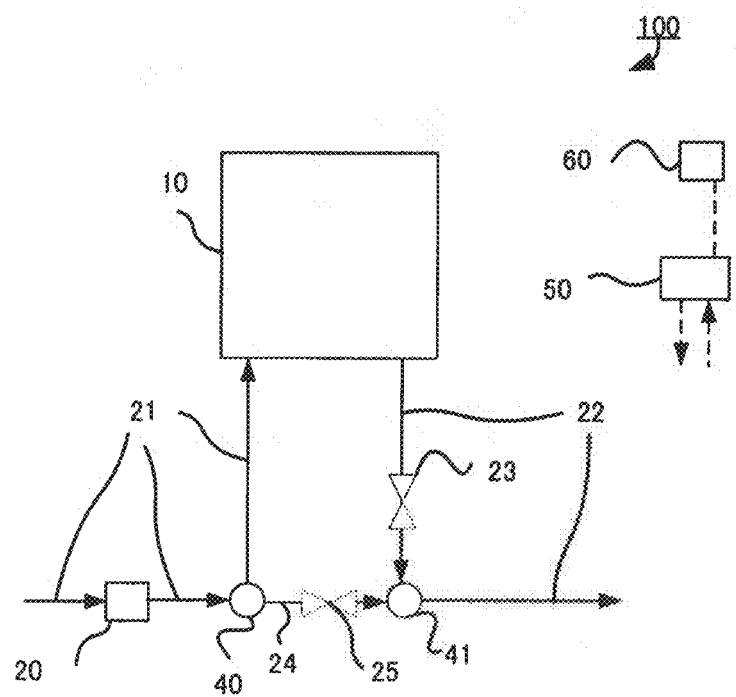
FIG. 2 is a schematic configuration diagram of an example of the fuel cell system of the present disclosure.

FIG. 2 is a schematic configuration diagram of an example of the fuel cell system of the present disclosure.

A fuel cell system 100 shown in FIG. 2 includes a fuel cell 10, an air compressor 20, an oxidant gas supply flow path 21, an oxidant off-gas discharge flow path 22, an oxidant gas pressure control valve 23, a bypass flow path 24, a bypass valve 25, a controller 50 and an altitude sensor 60. In FIG. 2, only the oxidant gas system is illustrated, and other systems such as the fuel gas system and the cooling system are not illustrated.

The bypass flow path 24 connects a branch 40 of the oxidant gas supply flow path 21 and a junction 41 of the oxidant off-gas discharge flow path 22.

Figure 3:
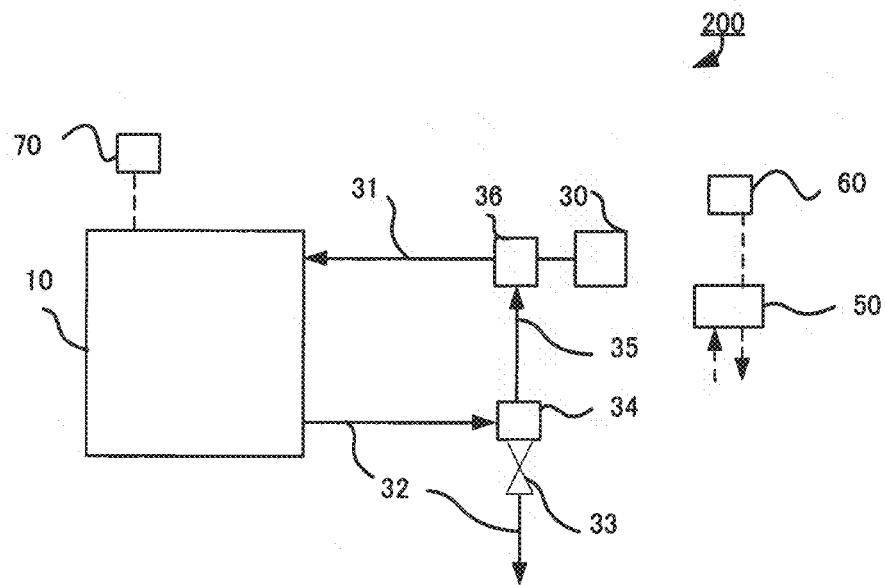
FIG. 3 is a schematic configuration diagram of another example of the fuel cell system of the present disclosure.

FIG. 3 is a schematic configuration diagram of another example of the fuel cell system of the present disclosure.

A fuel cell system 200 shown in FIG. 3 includes a fuel cell 10, a fuel gas supplier 30, a fuel gas supply flow path 31, a fuel off-gas discharge flow path 32, a gas and water discharge valve 33, an anode gas-liquid separator 34, a circulation flow path 35, an ejector 36, a controller 50, an altitude sensor 60 and an output sensor 70. In FIG. 3, only the fuel gas system is illustrated, and other systems such as the oxidant gas system and the cooling system are not illustrated.

FIG. 4 is a flowchart illustrating an example of control of the fuel cell system of the present disclosure.

First, the altitude sensor measures the altitude of the air vehicle.

Next, when the controller detects an altitude increase measured by the altitude sensor, the controller increases the rotational speed of the air compressor to be larger than the latest rotational speed, and the controller increases the opening degree of the bypass valve to be larger than the latest opening degree. Then, the controller ends the control.

On the other hand, when the controller does not detect the altitude increase measured by the altitude sensor, the controller may end the control, or the controller may keep the latest rotational speed of the air compressor and the latest opening degree of the bypass valve. As the case where the controller does not detect the altitude increase, examples include, but are not limited to, a case where the air vehicle levels off at a predetermined altitude. In this case, the controller may keep the latest rotational speed of the air compressor and the latest opening degree of the bypass valve.

When the controller detects an altitude decrease measured by the altitude sensor, the controller may decrease the rotational speed of the air compressor to be smaller than the latest rotational speed and may decrease the opening degree of the bypass valve to be smaller than the latest opening degree.

FIG. 5 is a flowchart illustrating another example of control of the fuel cell system of the present disclosure.

First, the altitude sensor measures the altitude of the air vehicle, and the output sensor measures the output of the fuel cell.

Then, when at least one of the condition in which the controller detects the altitude increase measured by the altitude sensor, and the condition in which the output of the fuel cell is less than the predetermined output value, is met, the controller increases the fuel gas supply from the fuel gas supplier to the fuel cell to be larger than the latest fuel gas supply, and the controller decreases the frequency of opening the gas and water discharge valve to be smaller than the latest frequency. Then, the controller ends the control.

On the other hand, when both the condition in which the controller detects the altitude increase measured by the altitude sensor, and the condition in which the output of the fuel cell is less than the predetermined output value, are not met, the controller may end the control, or the controller may keep the latest fuel gas supply from the fuel gas supplier to the fuel cell and keep the latest frequency of opening the gas and water discharge valve.

2. Second Embodiment

The fuel cell system of the present disclosure is a fuel cell system for air vehicles,
wherein the fuel cell system comprises:
a fuel cell,
a fuel gas system for supplying fuel gas to the fuel cell,
an output sensor for measuring the output of the fuel cell,
an altitude sensor, and
a controller;
wherein the fuel gas system comprises a fuel gas supplier and a gas and water discharge valve for allowing fuel off-gas, which is discharged from the fuel cell, to be discharged to the outside; and
wherein the controller increases a fuel gas supply from the fuel gas supplier to the fuel cell, and the controller decreases the frequency of opening the gas and water discharge valve, when at least one of the condition in which the controller detects the altitude increase measured by the altitude sensor, and the condition in which the output of the fuel cell is less than the predetermined output value, is met.

In the second embodiment of the present disclosure, in the fuel gas system, the frequency of discharging the fuel off-gas and the fuel gas supply from the fuel tank are controlled according to the altitude and the output of the fuel cell, and better fuel efficiency is obtained with maintaining normal power generation.

The fuel cell system of the present disclosure may include the oxidant gas system for supplying oxidant gas to the fuel cell.

The oxidant gas system may include the air compressor and the bypass flow path bypassing the fuel cell.

The bypass flow path may include the bypass valve.

When the controller detects the altitude increase measured by the altitude sensor, the controller may increase the rotational speed of the air compressor, and the controller may increase the opening degree of the bypass valve.

Accordingly, when the altitude is high, in the oxidant gas system, the pressure is increased by increasing the rotational speed (i.e., the air flow rate) of the air compressor (ACP) to reduce oxygen partial pressure shortages. At the same time, along with an altitude increase, the opening degree of the bypass valve is changed to supply only the air flow rate necessary for power generation of the fuel cell, thereby reducing the drying of the fuel cell.

As the fuel cell, fuel gas system, oxidant gas system, output sensor, altitude sensor, controller and so on of the second embodiment, examples include, but are not limited to, those exemplified above as the fuel cell, fuel gas system, oxidant gas system, output sensor, altitude sensor, controller and so on of the first embodiment.

REFERENCE SIGNS LIST

10. Fuel cell
20. Air compressor
21. Oxidant gas supply flow path
22. Oxidant off-gas discharge flow path
23. Oxidant gas pressure control valve
24. Oxidant gas bypass flow path
25. Bypass valve
30. Fuel gas supplier
31. Fuel gas supply flow path
32. Fuel off-gas discharge flow path
33. Gas and water discharge valve
34. Anode gas-liquid separator
35. Circulation flow path
36. Ejector
40. Branch
41. Junction
50. Controller
60. Altitude sensor
70. Output sensor
100. Fuel cell system
200. Fuel cell system

The invention claimed is:

1. A fuel cell system for air vehicles,
wherein the fuel cell system comprises:
a fuel cell,
an oxidant gas system for supplying oxidant gas to the fuel cell,
an altitude sensor, and
a controller;
wherein the oxidant gas system comprises an air compressor and a bypass flow path bypassing the fuel cell;
wherein the bypass flow path comprises a bypass valve; and
wherein, when the controller detects an altitude increase measured by the altitude sensor, the controller increases a rotational speed of the air compressor, and the controller increases an opening degree of the bypass valve.

2. The fuel cell system according to claim 1,
wherein the fuel cell system further comprises a fuel gas system for supplying fuel gas to the fuel cell, and an output sensor for measuring an output of the fuel cell;
wherein the fuel gas system comprises a fuel gas supplier and a gas and water discharge valve for allowing fuel off-gas, which is discharged from the fuel cell, to be discharged to the outside; and
wherein the controller increases a fuel gas supply from the fuel gas supplier to the fuel cell, and the controller decreases a frequency of opening the gas and water discharge valve, when at least one of a condition in which the controller detects the altitude increase measured by the altitude sensor, and a condition in which the output of the fuel cell is less than a predetermined output value, is met.

3. An air vehicle comprising the fuel cell system defined by claim 1.

* * * * *